US009425448B2

(12) United States Patent
Miura et al.

(10) Patent No.: US 9,425,448 B2
(45) Date of Patent: Aug. 23, 2016

(54) SEALED BATTERY AND SAFETY VALVE (75) Inventors: Kyouei Miura, Hamamatsu (JP);
Shigeru Matsumoto, Hamamatsu (JP);
Shinji Hamada, Toyohashi (JP)

(73) Assignee: PRIMEARTH EV ENERGY CO., LTD., Kosai-Shi (JP)

( * ) Notice: Subject to any disclaimer, the term of this patent is extended or adjusted under 35 U.S.C. 154(b) by 266 days.

(21) Appl. No.: 14/124,547

(22) PCT Filed: May 30, 2012

(86) PCT No.: PCT/JP2012/063981
§ 371 (c)(1),
(2), (4) Date: Dec. 6, 2013

(87) PCT Pub. No.: WO2012/172980
PCT Pub. Date: Dec. 20, 2012

(65) Prior Publication Data
US 2014/0106187 A1   Apr. 17, 2014

(30) Foreign Application Priority Data
Jun. 13, 2011   (JP) .................. 2011-130932

(51) Int. Cl.
*H01M 2/12* (2006.01)

(52) U.S. Cl.
CPC .......... *H01M 2/1229* (2013.01); *H01M 2/1211* (2013.01)

(58) Field of Classification Search
None
See application file for complete search history.

(56) References Cited

U.S. PATENT DOCUMENTS

| 5,554,455 | A | 9/1996 | Inoue et al. |
| 7,951,474 | B2 | 5/2011 | Schembri et al. |
| 2005/0212477 | A1* | 9/2005 | Uchida ............... H01M 2/1077 320/101 |
| 2006/0054852 | A1* | 3/2006 | Kokubu ............. F16K 31/0613 251/129.17 |
| 2008/0166625 | A1 | 7/2008 | Schembri et al. |
| 2008/0199763 | A1 | 8/2008 | Ito et al. |
| 2010/0099014 | A1* | 4/2010 | Zheng .................... F16K 17/02 429/56 |

FOREIGN PATENT DOCUMENTS

| CN | 101142698 A | 3/2008 |
| JP | 49-63433 U | 6/1974 |

(Continued)

OTHER PUBLICATIONS

Winter et al. "What are Batteries, Fuel Cells, and Supercapacitors?" Chemical Reviews, 2004, vol. 104, No. 10 p. 4245-4268.*

(Continued)

*Primary Examiner* — Patrick Ryan
*Assistant Examiner* — Christopher Domone
(74) *Attorney, Agent, or Firm* — Maschoff Brennan (57) ABSTRACT

A sealed battery includes a return type safety valve. An annular projection that projects toward a valve body from a valve port is formed on a valve seat for the safety valve. The projection includes a first projection region and a second projection region that are defined by a shape of a tip of the projection and arranged in parallel in a circumferential direction of the valve port. The first projection region and second projection region have different curvature radii in a cross-section of the projection taken along an axial direction of the valve body. The pressure per unit area applied to the second projection region by the valve body is higher than the pressure per unit area applied to the first projection region by the valve body.

8 Claims, 7 Drawing Sheets

(56) References Cited

FOREIGN PATENT DOCUMENTS

| | | |
|---|---|---|
| JP | 62-55870 U | 4/1987 |
| JP | 08-031398 A | 2/1996 |
| JP | 2001-110388 A | 4/2001 |
| JP | 2008-533658 A | 8/2008 |
| WO | 2006/095023 A2 | 9/2006 |

OTHER PUBLICATIONS

Chinese Office Action dated May 6, 2015 as received in Application No. 201280028770.6.

* cited by examiner

SEALED BATTERY AND SAFETY VALVE

TECHNICAL FIELD

The present invention relates to a sealed battery including a return type safety valve that releases abnormal internal pressure and to a return type safety valve suitable for use in a sealed battery.

BACKGROUND ART

Various types of rechargeable batteries known in the art have been proposed as a power supply for a portable electronic device and a power supply for an electric vehicle, a hybrid vehicle, and the like. Among such rechargeable batteries, in particular, a sealed battery often includes a so-called return type safety valve that is actuated to open when the internal pressure of a battery case exceeds a predetermined pressure and lower the internal pressure, and returns to a closed state after the internal pressure is lowered. When chemical reactions of a power generation element generates gas or the like and causes an abnormal increase in the internal pressure, such a safety valve is actuated to discharge the gas from the case. The safety valve described in patent document 1 is known as such a return type safety valve used in the sealed battery.

Figure 10:
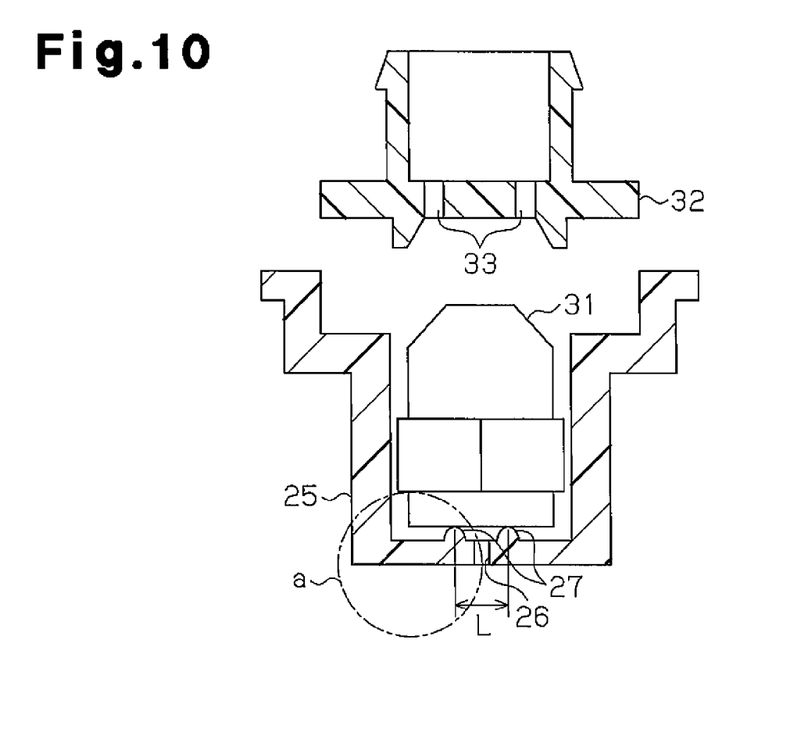
FIG. 10 is a cross-sectional view illustrating a conventional safety valve.

As illustrated in FIG. 10, the safety valve described in patent document 1 includes a valve case 25 coupled to a battery container that accommodates a pole plate group of a positive electrode and a negative electrode, which form a battery. In the middle of a bottom wall of the valve case 25, a valve port 26 is arranged in communication with the battery container, and an annular seal projection 27 is formed around the valve port 26. The valve case 25 accommodates a valve body 31, which is formed from rubber or the like that is pressed against the seal projection 27. A valve lid 32 is engaged with an upper open end of the valve case 25 that accommodates the valve body 31. The valve lid 32 includes an open port 33 that is in communication with the internal space of the valve case 25. In the safety valve configured in such a manner, when the internal pressure of the battery is within the normally expected range, the seal between the seal projection 27 and the valve body 31 is maintained to isolate the inside of the battery from the outside so that the gas in the battery does not leak out. However, when the internal pressure of the battery abnormally increases and reaches a certain set value, the internal pressure opens (elastically contracts) the valve body 31, and gas is discharged out of the battery through between the seal projection 27 and the valve body 31.
Patent Document 1: Japanese Laid-Open Patent Publication No. 2001-110388

SUMMARY OF THE INVENTION

Two functions are required for such a safety valve, a sealing function, which maintains a valve-closed state under pressures expected for normal usage environment to seal contents such as electrolytic solution and various types of gases within the battery, and an opening function, which opens to release the internal pressure of the battery when the internal pressure abnormally increases and reaches a predetermined pressure.

Figure 11:
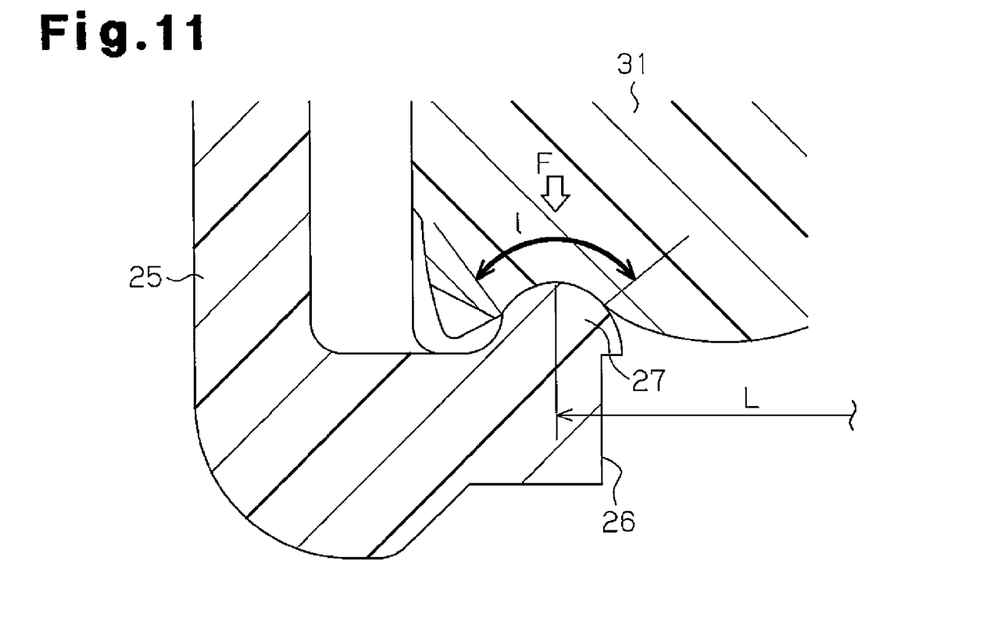
FIG. 11 is an enlarged cross-sectional view of the conventional safety valve illustrating the portion corresponding to region a in FIG. 10.

However, in a conventional safety valve including the safety valve described in patent document 1, it is difficult to improve the sealing function of the safety valve while maintaining the opening function of the safety valve. For example, as illustrated in FIG. 11, which is an enlarged view of the portion corresponding to region a in FIG. 10, the opening function of the safety valve is correlated with the following equation (1), where "L" is the length between the vertices of the seal projection 27 in FIG. 10 (cross-section of the projections 27 in the axial direction of the valve body 31), "F" is the load applied to the seal projections 27 by the valve body 31, and the seal length, which is the contact length of the bottom surface of the valve body 31 and the edge of the seal projection 27 in the axial cross-section of the valve body 31, is "l".

$$F/Ll \quad (1)$$

The sealing function of the safety valve is correlated with the following equation (2)

$$l/L \quad (2)$$

Thus, to improve the sealing function of the safety valve having such properties, for example, when the seal length "l" of the seal projection is increased, the sealing function of the safety valve is improved but the pressure that opens the safety valve decreases. Furthermore, even if the sealing function of the safety valve were to be improved by reducing the length "L" between the vertices of the seal projections 27, the length "L" between the vertices of the seal projections 27 can only be reduced to the range of the diameter of the valve port 26. Thus, there is a limit for improvement of the sealing function. In this manner, it is difficult to improve the sealing function of the safety valve while maintaining the opening function of the safety valve.

Accordingly, it is an object of the present invention to provide a sealed battery capable of satisfying both the required sealing function and opening function, and to provide a return type safety valve that may be applied to the sealed battery.

One aspect of the present invention is a sealed battery including a return type safety valve. The return type safety valve is provides with a valve case that includes an accommodation unit having a valve port that is in communication with a battery container accommodating a pole plate group provided with a positive electrode and a negative electrode and a valve seat extending around the valve port. A valve body is accommodated in the accommodation unit. A valve lid seals the valve port by pushing the valve body against the valve seat. The valve seat includes an annular projection that projects toward the valve body. The projection includes a first projection region and a second projection region defined by a shape of a tip of the projection and arranged in parallel in a circumferential direction of the valve port. The first projection region and the second projection region have different curvature radii in a cross-section of the projection taken along an axial direction of the valve body. At least a portion of the first projection region is arranged at an outer side of the second projection region, and the pressure per unit area applied to the second projection region by the valve body is higher than the pressure per unit area applied to the first projection region by the valve body.

According to the configuration described above, the compression force of the portion of the valve body that contacts the second projection region increases. Thus, the closely-attached state of the second projection region and the valve body is maintained, and the sealed state of the valve port in the safety valve that is in communication with the battery container is maintained until the internal pressure of the battery reaches a certain set value. When the internal pressure of the battery abnormally rises and reaches the pressure (open-valve pressure) exceeding the area pressure of the second projection region and the valve body, the valve body is elastically contracted and opened by the open-valve pressure. In other words, the open-valve pressure at which the valve body opens is in accordance with the area pressure of the second projection region and the valve body since the pressure per unit area of the second projection region and the valve body is set to be higher than the pressure per unit area of the first projection region and the valve body. Therefore, in the configuration described above, the opening function required for the safety valve is ensured by the second projection region of the projection.

In the cross-section of the projection in the axial direction of the valve body, the sealing function of the safety valve is correlated with the following equation (3), where "$L_2$" is the length between the second projection regions (e.g., length between the vertices), "$l_2$" is the seal length, which is the contact length of the valve body and the second projection region, "$L_1$" is the length between the first projection regions (e.g., length between the vertices) arranged on the outer side of the second projection region, and "$l_1$" is the seal length, which is the contact length of the valve body and the first projection region.

$$l_2/L_2 + l_1/L_1 \quad (3)$$

In other words, the sealing function of the safety valve is added to the sealing function ($l_2/L_2$) by the second projection region that ensures the opening function requisite for the safety valve, and the sealing function ($l_1/L_1$) by the first projection region, which is separate from the second projection region. The sealing function of the safety valve is thus improved by the addition of the sealing function by the first projection region.

Furthermore, since the projection is configured by the first projection region and the second projection region, the sealing function of the safety valve can be improved by enlarging the seal length $l_1$ of the region different from the second projection region that ensures the opening function of the safety valve, that is, the first projection region and the length $L_1$ between the first projection regions. The opening function of the safety valve is correlated with $F_2/L_2 l_2$ according to equation (1), "$F_2$" being the load acting on the second projection region from the valve body, and substantially is in accordance with the pressure per unit area acting on the second projection region from the valve body. Thus, the sealing function of the safety valve can be improved while fixing the opening function of the second projection region, that is, the open-valve pressure of the safety valve to a desired value. Both the opening function and the sealing function of the safety valve can thus be satisfactorily satisfied.

Preferably, the projection is ring-shaped.

A typical valve port is cylindrical. By forming a ring-shape projection, the distance between the valve port and the first and second projection regions is uniform. Thus, the distance between the projection region located closer to the valve port and the valve port becomes uniform over the entire circumference, and the internal pressure applied to this projection region becomes uniform. This reduces variations in the open-valve pressure and variation in the seal, and a safety valve that operates more stably can be realized.

Preferably, a curvature radius of the first projection region is greater than or equal to a curvature radius of the second projection region in the cross-section of the projection in the axial direction of the valve body.

According to the configuration described above, the seal length ($l_1$) of the first projection region obviously becomes greater than the seal length ($l_2$) of the second projection region at the cross-section of the projection in the axial direction of the valve body. The sealing function at the first projection region is thus improved by the enlargement of the seal length ($l_1$) of the first projection region.

Further, according to the configuration described above, the shape of the second projection region is steeper than the shape of the first projection region, and the pressure per unit area between the second projection region and the valve body is further increased.

Preferably, the curvature radius of the first projection region in the cross-section of the projection in the axial direction of the valve body is set in a range of "1×R" to "10/3×R", where R is the curvature radius of the second projection.

With regard to the sealing function of the safety valve, the durability of the valve body that contacts the projection decreases if the curvature radius of the projection at the contacting portion of the projection and the valve body is too small, and the leakage amount increases over time. With regard to the opening function of the safety valve, variations in the open-valve pressure tend to increase if the curvature radius of the projection at the contacting portion of the projection and the valve body is too large. According to the configuration described above, however, the durability at the contacting portion of the projection and the valve body can be ensured and the uniformity of the open-valve pressure can also be satisfied by forming the first projection region and the second projection region under the conditions described above.

Preferably, the first projection region and the second projection region are formed by two separate projections.

According to the configuration described above, the opening function is guaranteed by the projection formed in the second projection region, and the sealing function of the safety valve is guaranteed by the seal maintained between each projection formed in the first and second projection regions and the valve body. This increases the degree of freedom for selection of the shape of the safety valve corresponding to the demands of the sealing function and the opening function.

Preferably, a projection length of the second projection region in the axial direction of the valve body is greater than a projection length of the first projection region in the axial direction of the valve body.

According to the configuration described above, the second projection region is actively brought into contact under pressure with the bottom surface of the valve body. The pressure per unit area of the second projection region and the valve body thus can be higher than the pressure per unit area of the first projection region and the valve body by adjusting the projection length of each region.

Preferably, the sealed battery includes a nickel-hydrogen battery.

According to such configuration, the safety valve in which both the opening function and the sealing function are satisfied is used in the nickel-hydrogen battery in which highly accurate pressure management and sealing are required. Therefore, a highly reliable nickel-hydrogen battery can be realized.

A second mode of the present invention is a return type safety valve. The safety valve is provided with a valve case that includes an accommodation unit having a valve port, which is in communication with a battery container accommodating a pole plate group provided with a positive electrode and a negative electrode, and a valve seat extending around the valve port. A valve body is accommodated in the accommodation unit. A valve lid seals the valve port by pushing the valve body against the valve seat. The valve seat includes an annular projection that projects toward the valve body. The projection includes a first projection region and a second projection region defined by a shape of a tip of the projection and arranged in parallel in a circumferential direction of the valve port, wherein the first projection region and the second projection region have different curvature radii in a cross-section of the projection taken along an axial direction of the valve body. At least a portion of the first projection region is arranged at an outer side of the second projection region, and the pressure per unit area applied to the second projection region by the valve body is higher than the pressure per unit area applied to the first projection region by the valve body.

According to the configuration described above, the compression force of the portion of the valve body that contacts the second projection region increases. The closely-attached state of the second projection region and the valve body is thus maintained. Thus, the sealed state of the valve port of the safety valve in communication with the battery container is maintained until the internal pressure of the battery reaches a certain set value. When the internal pressure of the battery abnormally rises and reaches the pressure (open-valve pressure) exceeding the area pressure of the second projection region and the valve body, the valve body is elastically contracted and opened by the open-valve pressure. In other words, the open-valve pressure at which the valve body opens is in accordance with the area pressure of the second projection region and the valve body since the pressure per unit area of the second projection region and the valve body is set to be higher than the pressure per unit area of the first projection region and the valve body. Therefore, in the configuration described above, the opening function required for the safety valve is guaranteed by the second projection region of the projection.

At the cross-section of the projection in the axial direction of the valve body, the sealing function of the safety valve is correlated with the following equation (3), where "$L_2$" is the length between the second projection regions (e.g., length between the vertices), "$l_2$" is the seal length, which is the contact length of the valve body and the second projection region, "$L_1$" is the length between the first projection regions (e.g., length between the vertices) arranged on the outer side of the second projection region, and "$l_1$" is the seal length, which is the contact length of the valve body and the first projection region.

$$l_2/L_2 + l_1/L_1 \quad (3)$$

In other words, the sealing function ($l_2/L_2$) by the second projection region that guarantees the opening function requisite for the safety valve, and the sealing function ($l_1/L_1$) by the first projection region, which is a region different from the second projection region, are added to the sealing function of the safety valve. The sealing function of the safety valve is thus improved by the addition of the sealing function by the first projection region.

Furthermore, since the projection is configured by the first projection region and the second projection region, the sealing function of the safety valve can be improved by enlarging the seal length $l_1$ of the region different from the second projection region that guarantees the opening function of the safety valve, that is, the first projection region and the length $L_1$ between the first projection regions. The opening function of the safety valve is correlated with $F_2/L_2 l_2$ according to equation (1), "$F_2$" being the load acting on the second projection region from the valve body, and substantially is in accordance with the pressure per unit area acting on the second projection region from the valve body. Thus, the sealing function of the safety valve can be improved while fixing the opening function of the second projection region, that is, the open-valve pressure of the safety valve to a desired value. Both the opening function and the sealing function of the safety valve thus can be satisfactorily satisfied.

According to the sealed battery and the safety valve of the present invention, the required sealing function and opening function may both be satisfactorily satisfied.

BRIEF DESCRIPTION OF THE DRAWINGS

FIG. 3(b) is a side view illustrating the lid body of FIG. 2, and FIG. 3(c) is a cross-sectional view illustrating the lid body of FIG. 2.

DESCRIPTION OF THE EMBODIMENTS

First Embodiment

A first embodiment of a sealed battery including a return type safety valve according to the present invention will now be described with reference to FIG. 1 to FIG. 4.

As illustrated in FIG. 1(a), a battery module is configured by electrically connecting in series a plurality of (e.g., six) electric cells 140 serving as sealed batteries to obtain a required power capacity. The battery module has a structure in which the plurality of individual box-shaped electric cells 140 are arranged such that the short side surfaces, which are the side surfaces, face each other when the surface having the largest surface area (long side surface) is viewed vertically. In other words, the battery module is configured by coupling six electric cells 140, which are, for example, nickel-hydrogen batteries.

As illustrated in FIG. 1(b), the battery module is made of resin, and is configured by a resin integrated battery container 100 having an upper opening and a resin lid body 200 for sealing the upper opening of the integrated battery container 100. The integrated battery container includes six battery containers 141 that accommodate a power generation element, and the like including a positive plate, a negative plate, a separator, a current collecting plate, an electrolytic solution, and the like. The lid body 200 closes the upper surface opening of the integrated battery container 100 to seal and partition the battery containers 141 in a non-communicating state. The power generation element in each battery container 141 generates or absorbs gas such as hydrogen, oxygen, and the like through chemical reaction that occurs when charging or discharging the electric cell 140. Therefore, when excessive chemical reactions occur, excessive gas may be generated.

External terminals 120, 130 are respectively arranged on the side surfaces in the longitudinal direction of the battery module. The electric cells 140 are series-connected between the external terminal 120 and the external terminal 130 so that the total output of the six electric cells 140 is obtained from the external terminals 120, 130.

The lid body 200 of the battery module includes a sensor attachment hole 201, which is used for attachment of a sensor that detects the internal temperature of the battery module.

Figure 1:
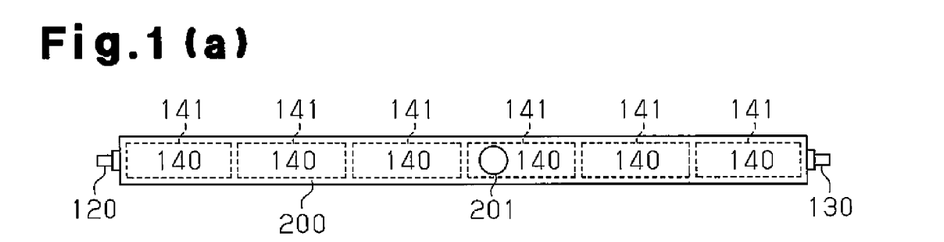
FIG. 1(a) is a plan view illustrating a sealed battery including a safety valve in a first embodiment.
FIG. 1(b) is a side view illustrating the sealed battery of FIG. 1(a).
Figure 2:
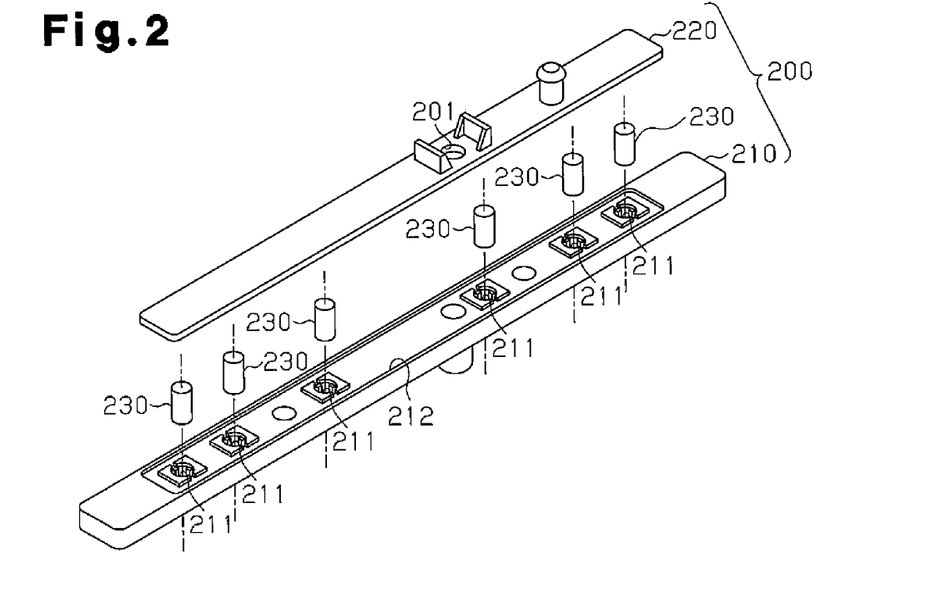
FIG. 2 is a perspective view illustrating a lid body of a battery module in the first embodiment.

As illustrated in FIG. 2, which illustrates an exploded structure, the lid body 200 of the battery module of the first embodiment functions as a safety valve that manages the internal pressures of the six battery containers 141, which are sealed and partitioned. The lid body 200 is configured to include a valve case 210, which is joined with the integrated battery container 100 of the battery module, and a valve cover 220 (valve lid), which is attached to the valve case 210.

Figure 4A:
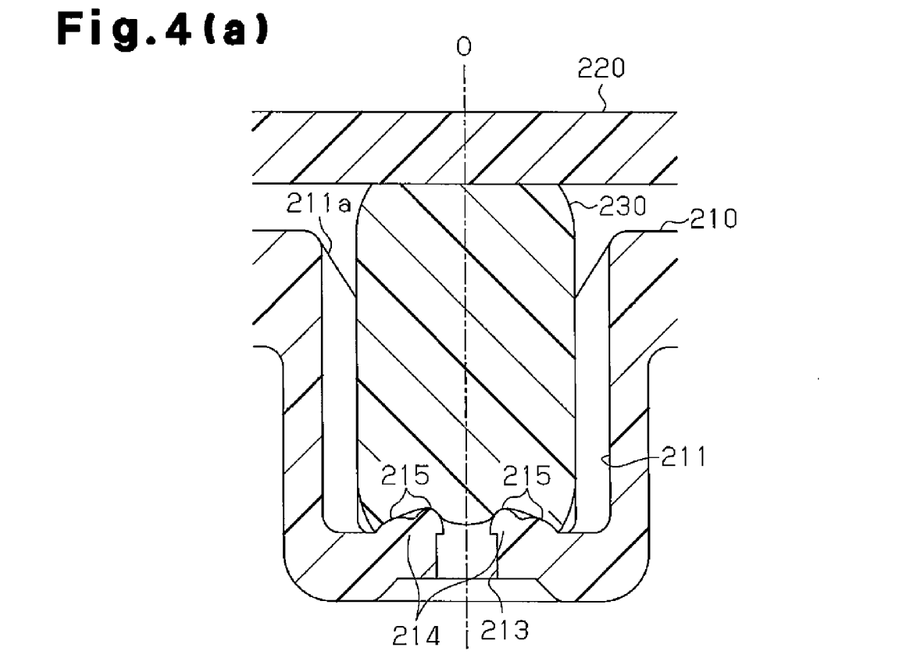
FIG. 4(a) is a cross-sectional view illustrating the safety valve of the first embodiment.

Six tubular valve body accommodation units 211 having a valve port 213 (see FIG. 4(a)) at the bottom surface are arranged in the valve case 210 in correspondence with the battery containers 141. Six valve bodies 230 formed by rubber elastic bodies are respectively accommodated in the valve body accommodation units 211. A valve cover accommodation groove 212, which is engaged with the valve cover 220 is engaged, is formed in the upper surface of the valve case 210. The valve cover 220 is engaged with the valve cover accommodation groove 212 with each valve body 230 accommodated in each valve body accommodation unit 211.

Figure 3A:
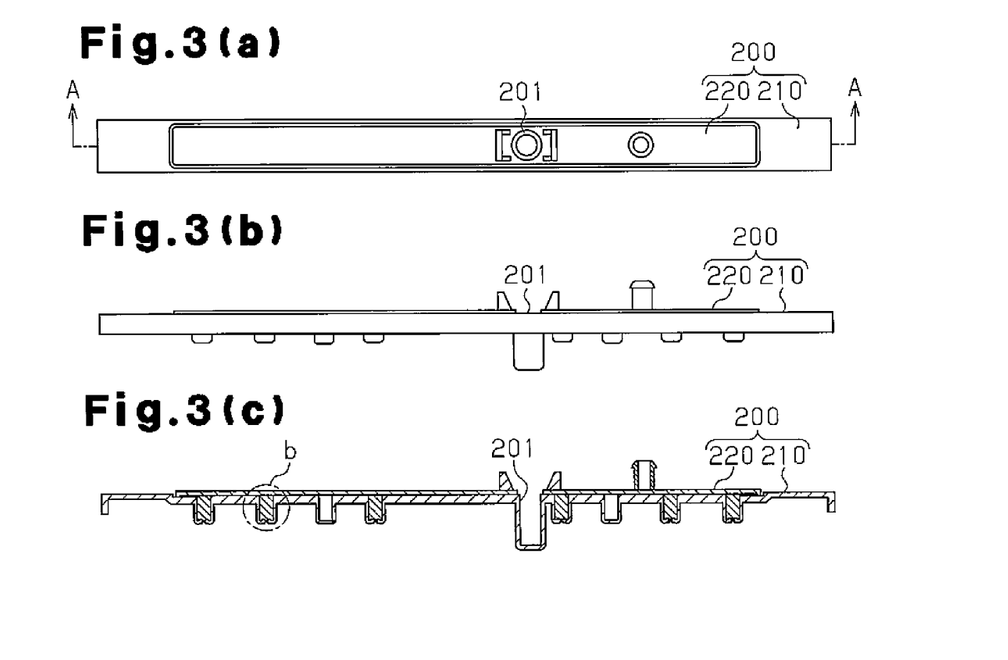
FIG. 3(a) is a plan view illustrating the lid body of FIG. 2.

In other words, as illustrated in FIG. 3(a) and FIG. 3(b), which respectively illustrates a plan view and a side view of the lid body 200, the valve cover 220 is attached to the upper surface of the valve case 210 in the usage state of the battery module. As illustrated in FIG. 3(c), which illustrates the cross-sectional structure taken along line A-A in FIG. 3(a), the valve body accommodation unit 211 of the valve case 210 is sealed by the valve cover 220 with each valve body 230 accommodated in the valve body accommodation unit 211.

The safety valve formed by the lid body 200 opens the valve body 230 under abnormal pressures of the corresponding battery container 141 when the internal pressure of the corresponding battery container 141 becomes an abnormal pressure, which is a pressure lower than or equal to the withstanding pressure of the battery module (battery container 141) but greater than the internal pressure for normal use. Thus, when the internal pressure of the battery container 141 of each electric cell 140 sealed by the lid body 200 becomes an abnormal pressure, the safety valve (valve body 230) opens to release the abnormal pressure to prevent the internal pressure from exceeding the withstanding pressure of the battery container 141.

The structure of the safety valve of the first embodiment will now be described in detail with reference to FIG. 4(a) and FIG. 4(b).

As illustrated in FIG. 4(a), which is an enlarged view of the portion corresponding to region b in FIG. 3(c), for example, the valve body accommodation unit 211 has a cylindrical shape, and a cylindrical valve port 213 is formed around the center O of the valve body accommodation unit 211 in the bottom surface. A hole diameter of the valve port 213 of the first embodiment is formed to be, for example, greater than or equal to about "1.0 mm" to facilitate molding. Ribs 211a, which support the valve body 230 from the side, project toward the valve body 230 from the inner side wall of the valve body accommodation unit 211. The valve body 230 is fixed in the valve body accommodation unit 211 when supported by each rib 211a from the side in the valve body accommodation unit 211. The height of the valve body 230 is set to be greater than the depth of the valve body accommodation unit 211.

A valve seat 214, which supports the valve body 230 from the bottom surface side, is arranged around the valve port 213 on the bottom surface of the valve body accommodation unit 211. When the valve cover 220 is attached to the valve cover accommodation groove 212 with the valve body 230 arranged on the valve seat 214, the valve body 230 compresses thereby sealing the valve port 213.

Figure 4B:
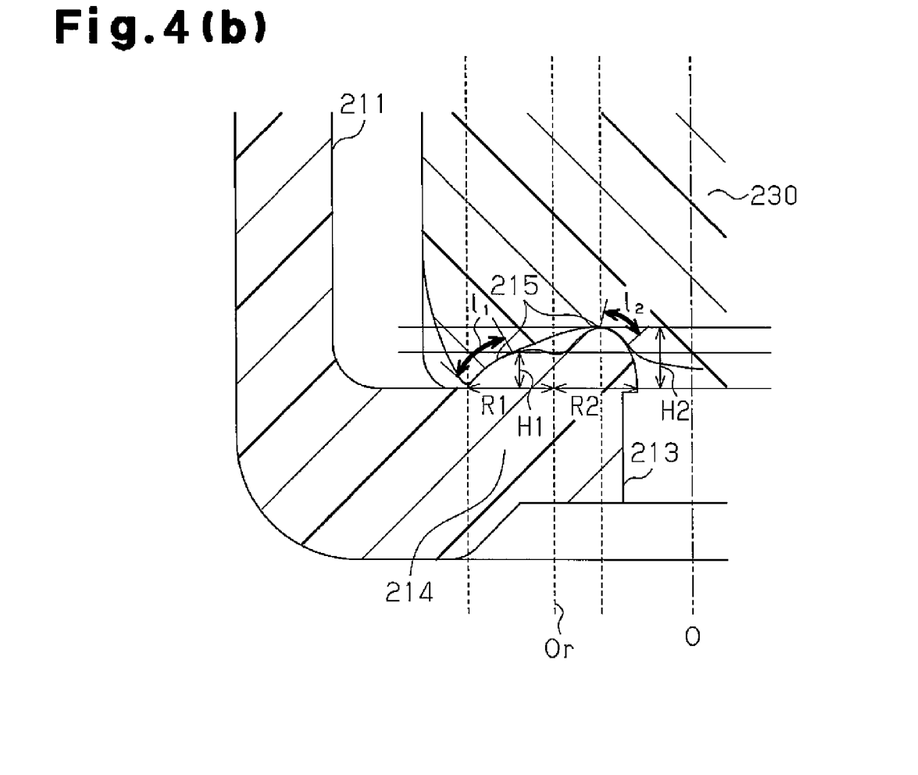
FIG. 4(b) is a partially enlarged view illustrating a projection of the safety valve of FIG. 4(a).

In the first embodiment, a projection 215 that projects from the inner circumferential edge of the valve port 213 toward the valve body 230 is ring-shaped and extends around the center O of the valve port 213, as illustrated in FIG. 4(b), which illustrates an enlarged structure of the valve seat 214. The projection 215 includes a first projection region R1 and a second projection region R2 defined by the shape of the tip of the projection 215. The first projection region R1 and the second projection region R2 are formed to have different curvature radii at the cross-section of the projection 215 in the axial direction of the valve body 230. The first projection region R1 and the second projection region R2 are formed to be parallel in the circumferential direction of the valve port 213. In other words, the projection 215 is divided into two from the center Or of the formation region of the projection 215 in the cross-section orthogonal to the valve port 213, namely, the first projection region R1 (outer circumferential side) and the second projection region R2 (inner circumferential side).

In this manner, the projection 215 is formed as two composite projections having different curvature radii at the cross-section of the projection 215 in the axial direction of the valve body 230. In the first embodiment, the curvature radius of the first projection region R1 is set to be greater than or equal to the curvature radius of the second projection region R2 at the cross-section of the projection 215 in the axial direction of the valve body 230. For example, the curvature radius of the first projection region R1 is formed in the range of "0.3 mm" to "1.0 mm", so that the sealing function in the first projection region R1 is exhibited to a maximum extent in view of the durability of the valve body 230 that contacts the first projection region R1. For example, at the cross-section of the projection 215 in the axial direction of the valve body 230, the curvature of the first projection R1 is set in the range of "1×R" to "10/3×R"

where R is the curvature radius of the second projection region R2. The open-valve pressure can thus be maintained.

The projection 215 is also formed such that a projection length H2 of the second projection region R2 in the axial direction of the valve body 230 is longer than a projection length H1 of the first projection region R1 in the axial direction of the valve body 230. In other words, the vertex of the projection 215 exists in the second projection region R2. The vertex of the projection 215 is thus located closer to the inner circumference than the center Or of the formation region of the projection 215, that is, closer to the valve port 213 than the center Or. Such shape of the projection 215 forms a seal portion, which radius is from the vertex of the projection 215 to the center O of the valve port 213. For example, the seal diameter (diameter of the seal portion) is set to be smaller than or equal to about "2.5 mm". In the first embodiment, the seal diameter is reduced since the vertex of the projection 215 is formed further toward the inner side than the center Or of the formation region of the projection 215. That is, the circumferential length of the seal portion in the circumferential direction of the projection 215 (valve port 213) is defined to the necessary minimum length. This improves the seal between the projection 215 and the valve body 230.

Furthermore, since the curvature radius of the first projection region R1 is greater than or equal to the curvature radius of the second projection region R2 in the cross-section of the projection 215 taken along the axial direction of the valve body 230, the inclined surface of the first projection region R1 becomes more gradual than the inclined surface of the second projection region R2, as illustrated in FIG. 4(b). In other words, the inclined surface of the second projection region R2 is steeper than the inclined surface of the first projection region R1. Thus a first seal length $l_1$, which is the contact length of the first projection region R1 of the projection 215 and the bottom surface of the valve body 230, is greater than a second seal length $l_2$, which is the contact length of the second projection region R2 of the projection 215 and the bottom surface of the valve body 230, in the cross-section taken along the axial direction of the valve body 230. In the cross-section of the projection 215 taken along the axial direction of the valve body 230, the sealing function of the safety valve is correlated with the following equation (4), where "$L_1$" is the length between the first projection regions R1 (e.g., length between the vertices), and "$L_2$" is the length between the second projection regions R2 (e.g., length between the vertices).

$$l_2/L_2 + l_1/L_1 \quad (4)$$

That is, the sealing function of the safety valve is obtained by adding the sealing function ($l_1/L_1$) in the first projection region R1 to the sealing function ($l_2/L_2$) in the second projection region R2. Therefore, the sealing function of the safety valve corresponding to equation (4) is improved by the increase in the first seal length $l_1$.

Since the cross-sectional shape of the second projection region R2 is steep and the projection length H2 of the second projection region R2 is longer than the projection length H1 of the first projection region R1, the pressure per unit area applied to the second projection region R2 by the bottom surface of the valve body 230 becomes higher than the pressure per unit area applied to the first projection region R1 by the bottom surface of the valve body 230. The opening function of the safety valve is correlated with the following equation (5), where $F_2$ is the load applied to the second projection region R2 by the bottom surface of the valve body 230.

$$F_2/L_2 l_2 \quad (5)$$

That is, since the area pressure $F_2/L_2 l_2$ per unit area applied to the second projection region R2 by the bottom surface of the valve body 230 is higher than the area pressure $F_1/L_1 l_1$ ($F_1$ is the load acting on the first projection region R1 from the valve body 230) per unit area applied to the first projection region R1 by the bottom surface of the valve body 230, the open-valve pressure of the safety valve is substantially in accordance with the area pressure of the second projection region R2. Therefore, the open-valve pressure of the safety valve is not affected even if the parameters $l_1$, $L_1$ related to the first projection region R1 are changed to improve the sealing function.

The operation of the safety valve of the first embodiment will now be described with reference to FIG. 4(b).

As illustrated in FIG. 4(b), when the valve cover 220 is attached to the valve cover accommodation groove 212 with the valve body 230 accommodated in the valve body accommodation unit 211, the bottom surface of the valve body 230 is pushed against the projection 215 formed on the valve seat 214. The bottom surface shape of the valve body 230 is thus elastically deformed in accordance with the shape of the projection 215. Thus, the bottom surface of the valve body 230 and the projection 215 come into close contact and seals the valve port 213. In each battery container 141, the leakage of gas and electrolytic solution from the battery container 141 is suppressed by maintaining the sealed state.

In this case, the first projection region R1 formed in the projection 215 differs from the second projection region R2 having the opening function. Thus, the sealing function between the projection 215 and the valve body 230 is improved by the formation of the first projection region R1. Therefore, even if gas and electrolytic solution in the battery container 141 leaks from between the second projection region R2 having the opening function and the valve body 230, the sealing function maintained between the first projection region R1, which is formed on the outer periphery of the second projection region R2, and the valve body 230 properly suppresses leakage of the gas and electrolytic solution out of the battery container 141.

When the internal pressure of the battery container 141 abnormally rises and reaches the open-valve pressure defined by the area pressure of the projection 215 and the valve body 230, the valve body 230 elastically deforms and opens. The gas generated in the battery container 141 is thus discharged out of the battery module by sequentially passing through the valve port 213, the gap of the valve body accommodation unit 211, and the valve cover 220.

In this case, the open-valve pressure at which the valve body 230 opens is correlated with the area pressure of the second projection region R2 of the projection 215 and the valve body 230 (see equation (5)). In other words, since the pressure per unit area of the second projection region R2 of the projection 215 and the valve body 230 is higher than the pressure per unit area of the first projection region R1 and the valve body 230, the valve body 230 does not open and the sealed state of the battery container 141 is maintained until the internal pressure of the battery container 141 reaches the area pressure of the second projection region R2 and the valve body 230. In the first embodiment, the area pressure with the valve body 230 can be sufficiently increased by the second projection region R2 of the projection 215 so that the open-valve pressure can be increased to the desired set value and the open-valve pressure can be accurately maintained at the set value. Furthermore, in the first embodiment, the distance from the center O of the valve port 213 to the second projection region R2 of the projection 215 is uniform over the entire circumference since the projection 215 is ring-shaped and extends around the center O of the valve port 213. The pressure on the second projection region R2 of the projection 215 thus becomes uniform over the entire surface, and the open-valve pressure becomes uniform due the second projection region R2 of the projection 215. Thus, the opening of the valve body 230 can be stably performed at the desired set value (open-valve pressure). Moreover, in the first embodiment, the second projection region R2 is formed toward the inner side from the first projection region R1 so that the valve body 230 is elastically deformed in a region surrounded by the portion that contacts the second projection region R2 in the bottom surface of the valve body 230 when the valve body 230 opens. Thus, the elastic deformation is small at the portion that contacts the first projection region R1 (outer portion of the second projection region R2) in the bottom surface of the valve body 230, and the sealed state of the valve body 230 and the first projection region R1 is accurately maintained.

In the first embodiment, when the internal pressure of the battery container 141 is lower than the open-valve pressure, the sealed state of the battery container 141 is maintained by the sealing function maintained between the valve body 230 and the first projection region R1 of the projection 215, and leakage of the contents of the battery container 141 is suppressed. Furthermore, the projection 215 has a dual structure formed by the first projection region R1 and the second projection region R2 and suppresses leakage of the contents of the battery container 141. Such sealed state of the battery container 141 is maintained until the internal pressure of the battery container 141 reaches the open-valve pressure defined by the area pressure of the second projection region R2 of the projection 215 and the valve body 230. Therefore, in the first embodiment, the sealing function is improved while maintaining the required opening function.

After the internal pressure of the battery container 141 reaches the open-valve pressure, the valve body 230 opens and decreases the internal pressure of the battery container 141 to lower than the open-valve pressure. Then, the shape of the valve body 230 is restored to maintain the sealed state of the battery container 141 again.

As described above, the sealed battery and the safety valve of the first embodiment have the advantages described below.

(1) The projection 215 that contacts the valve body 230 includes the first projection region R1 and the second projection region R2 defined by the shape of the tip of the projection 215. The first and second projection regions R1, R2 have different curvature radii in the cross-section of the projection 215 taken along the axial direction of the valve body 230. The pressure per unit area applied to the second projection region R2 by the valve body 230 is set to be higher than the pressure per unit area applied to the first projection region R1 by the valve body 230. Thus, the opening function required for the safety valve is guaranteed by the second projection region R2 of the projection 215, and the sealing function of the safety valve is guaranteed by the two regions, the first projection region R1 and the second projection region R2. Thus, the sealing function is improved while maintaining the opening function of the safety valve.

(2) The second projection region R2 is formed on the inner circumference side of the first projection region R1. The open-valve pressure is thus easily and accurately adjusted by the area pressure between the second projection region R2 of the projection 215 and the valve body 230. Furthermore, the sealing function is suitably maintained by the first projection region R1 along with the second projection region R2 until the internal pressure of the battery reaches the open-valve pressure.

(3) The projection 215 is ring-shaped. Thus, the pressure on the second projection region R2 formed closer to the valve port 213 becomes uniform, and the uniformity of the open-valve pressure is achieved.

(4) The projection 215 is formed as two composite projections having different curvature radii in the cross-section orthogonal to the valve port 213. In the cross-section of the projection 215 taken along the axial direction of the valve body 230, the curvature radius of the first projection region R1 is greater than or equal to the curvature radius of the second projection region R2. Thus, the pressure per unit area applied by the valve body 230 is set to different values between the first projection region R1 and the second projection region R2, which have different curvature radii. Therefore, the seal length $l_1$ of the region that is not responsible for the opening function, that is, the first projection region R1 is enlarged to improve the sealing function of the safety valve in proportion to the enlarged seal length $l_1$.

(5) The projection length H1 of the second projection region R2 is set to be greater than the projection length H1 of the first projection region R1 in the axial direction of the valve body 230. The pressure per unit area applied to the second projection region R2 by the valve body 230 is thus increased by an element that differs from the contact area, and the open-valve pressure may be set with a higher degree of freedom. The pressure per unit area of the second projection region R2 and the valve body 230 thus becomes higher than the pressure per unit area of the first projection region R1 and the valve body 230. Thus, the opening function of the safety valve is stably guaranteed by the second projection region R2.

(6) The integrated battery container 100 is configured by the battery containers 141, which are sealed and partitioned, and a safety valve is provided for each of the battery containers 141. With each sealed and partitioned battery container 141 as a unit, the safety valve that manages the pressure and ensures the sealed state is realized.

(7) A nickel-hydrogen battery is used as the sealed battery including the safety valve described above. Thus, even in the nickel-hydrogen battery in which pressure management is required to be performed with further accuracy and the sealing state is required to be further ensured, the nickel-hydrogen battery of higher reliability is realized by realizing both the opening function and the sealing function with the safety valve.

Second Embodiment

A second embodiment of a sealed battery and a safety valve according to the present invention will now be described with reference to FIG. 5(a) and FIG. 5(b). The second embodiment has a configuration in which the first projection region R1 and the second projection region R2 are configured by two separate projections, and the basic configuration is the same as the first embodiment.

Figure 5A:
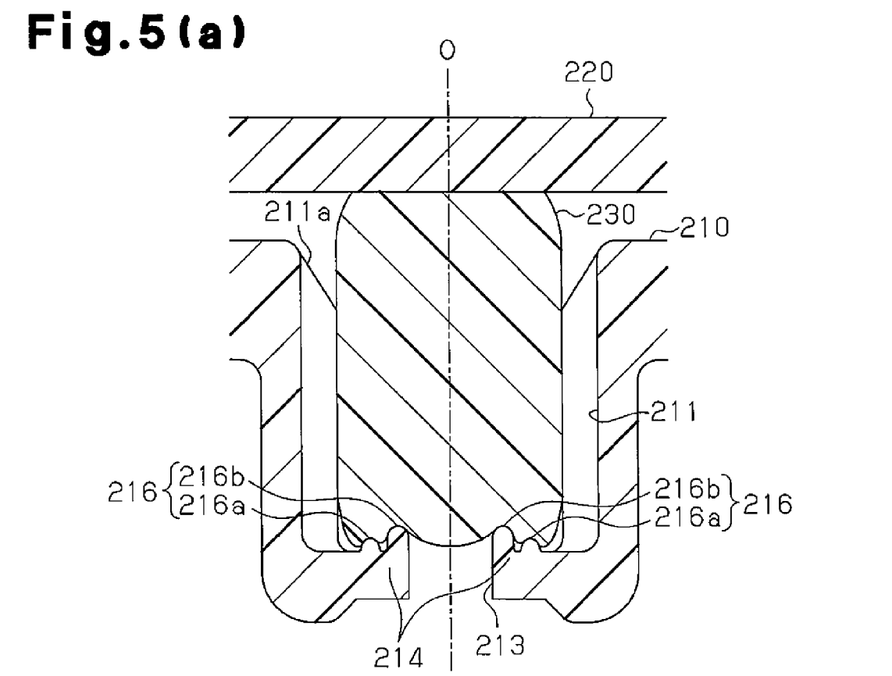
FIG. 5(a) is a cross-sectional view illustrating a safety valve in a second embodiment.
Figure 5B:
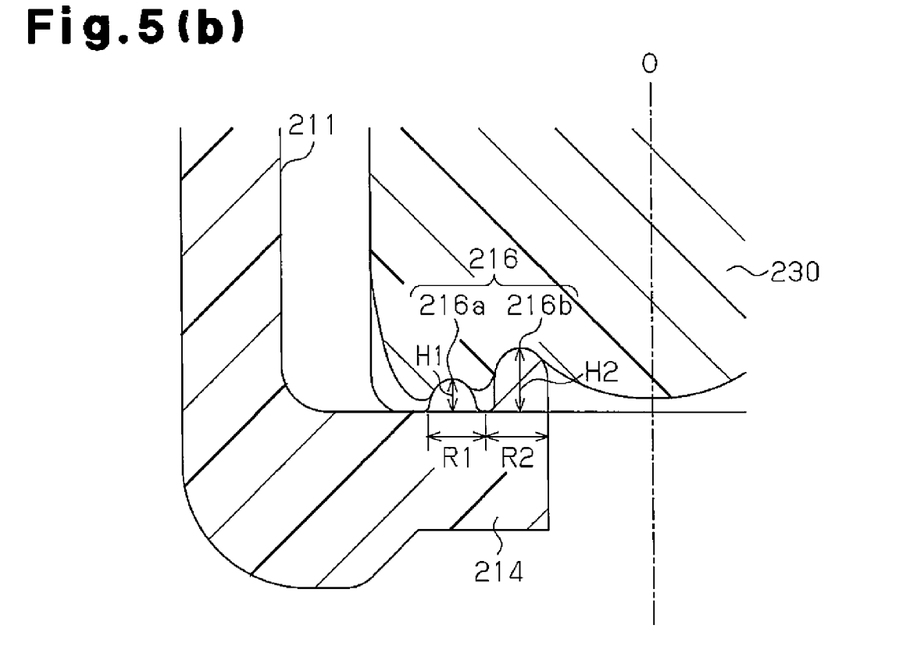
FIG. 5(b) is a partially enlarged view illustrating a projection of the safety valve of FIG. 5(a).

FIGS. 5(a) and 5(b) are cross-sectional views corresponding to FIGS. 4(a) and 4(b) and illustrate the safety valve of the second embodiment. In FIGS. 5(a) and 5(b), the same reference numerals are given to those components that are the same as the corresponding components of the first embodiment. Such components will not be described again.

As illustrated in FIG. 5(a), a projection 216 of the second embodiment is configured by two projections 216a and 216b. The projections 216a and 216b are ring-shaped and extend around the center O of the valve port 213. As illustrated in FIG. 5(b), which is an enlarged view of the projection 216, the first projection 216a is formed in the first projection region R1, and the second projection 216b is formed in the second projection region R2. The projection length H2 in the axial direction of the valve body 230 of the second projection 216b formed in the second projection region R2 is longer than the projection length H1 in the axial direction of the valve body 230 of the first projection 216a formed in the first projection region R1. The pressure per unit area of the second projection 216b, which is formed to have a long projection length, and the valve body 230 is thus adjusted to be higher than the pressure per unit area of the first projection 216a and the valve body 230. In other words, in the same manner as the first embodiment, the second projection 216b formed in the second projection region R2 having the opening function of the safety valve, and the open-valve pressure at which the valve body 230 opens is determined by the area pressure of the second projection 216b and the valve body 230 in the second embodiment.

In the second embodiment, the curvature radius of the first projection 216a and the curvature radius of the second projection 216b are approximate but are set as different values in the cross-section of the projection 216 taken along the axial direction of the valve body 230. Furthermore, in the second embodiment, the sealing function of the safety valve is improved by adding the first projection 216a since the first projection 216a is formed separately from the second projection 216b that guarantees the opening function of the safety valve.

The operation of the safety valve of the second embodiment will now be described with reference to FIG. 5(b).

As illustrated in FIG. 5(b), when the valve cover 220 is attached to the valve cover accommodation groove 212 with the valve body 230 accommodated in the valve body accommodation unit 211, the bottom surface of the valve body 230 is pushed against the projection 218 formed on the valve seat 214. The bottom surface shape of the valve body 230 is thus elastically deformed by the shapes of the first projection 216a and the second projection 216b so that the bottom surface of the valve body 230 and the first projection 216a and the second projection 216b are closely attached thereby sealing the valve port 213. Therefore, in each battery container 141, the leakage of gas and electrolysis solution in the battery container 141 is suppressed since the sealed state is maintained.

In this case, the first projection 216a arranged at the outer side of the second projection 216b independent from the second projection 216b, which is provided with the opening function, substantially does not elastically deform until the internal pressure of the battery container 141 reaches the open-valve pressure. Therefore, the sealing function between the projection 216 and the valve body 230 is guaranteed by two members, the second projection 216b and the first projection 216a. Thus, even if gas and electrolysis solution in the battery container 141 leaks out from between the second projection 216, which is located closer to the valve port 213, and the valve body 230, the gas and electrolysis solution in the battery container 141 is accurately suppressed from leaking out by the sealing function maintained between the first projection 216a and the valve body 230.

When the internal pressure of the battery container 141 abnormally rises and reaches the open-valve pressure defined by the area pressure of the second projection 216b and the valve body 230, the valve body 230 elastically deforms and opens. This discharges the gas generated in the battery container 141 out of the battery module by sequentially passing through the valve port 213, the gap of the valve body accommodation unit 211, and the valve cover 220.

In the second embodiment, the distance from the center O of the valve port 213 to the second projection 216b is uniform over the entire circumference since the first projection 216a and the second projection 216b are ring-shaped and extend around the center O of the valve port 213. The pressure applied to the second projection 216b thus becomes uniform over the entire surface, and the open-valve pressure becomes uniform due to the second projection 216b. Thus, the opening of the valve body 230 may be stably performed at the desired set value. Moreover, in the second embodiment, the second projection 216b is formed on the inner circumference side than the first projection 216a so that the valve body 230 elastically deforms in the region surrounded by the portion that contacts the second projection 216b in the bottom surface of the valve body 230 when the valve body 230 opens. At the portion that contacts the first projection 216a in the bottom surface of the valve body 230, the sealed state of the valve body 230 and the first projection 216a is properly maintained.

Therefore, in the second embodiment, when the internal pressure of the battery container 141 is lower than the open-valve pressure, the sealed state of the battery container 141 is maintained by the sealing function maintained between the valve body 230 and the first projection 216a, and leakage of the contents of the battery container 141. Furthermore, the projection 216 that has a dual structure of the first projection 216a and the second projection 216b suppresses leakage of the contents of the battery container 141. Such sealed state of the battery container 141 is maintained until the internal pressure of the battery container 141 reaches the open-valve pressure defined by the area pressure of the second projection 216b and the valve body 230. Therefore, in the second embodiment, the opening function and the sealing function are both achieved while improving both of the required opening function and the sealing function.

After the internal pressure of the battery container 141 reaches the open-valve pressure, and the internal pressure of the battery container 141 then decreases to lower than the open-valve pressure by opening the valve body 230, the shape of the valve body 230 is restored so that the sealed state of the battery container 141 is maintained again.

As described above, the sealed battery and the safety valve of the second embodiment have effects advantages (1) to (3) and (5) to (7) described above and also have the advantage described below instead of advantage (4).

(4A) The projection is configured by the separate first projection 216a and second projection 216b corresponding to the first projection region R1 and the second projection region R2, respectively. Accordingly, the sealing function of the safety valve is improved without changing the seal length and the diameter of the second projection 216b, that is, while fixing the opening function of the second projection 216b changed by the seal length and the diameter. This increases the degree of freedom for selecting the shape of the safety valve in correspondence with requests for the sealing function and the opening function.

Third Embodiment

A third embodiment of a sealed battery and a safety valve according to the present invention will now be described with reference to FIG. 6 and FIG. 7. The third embodiment adopts a sealed battery in which the battery containers are in communication, and the basic configuration is the same as the first embodiment.

Figure 6:
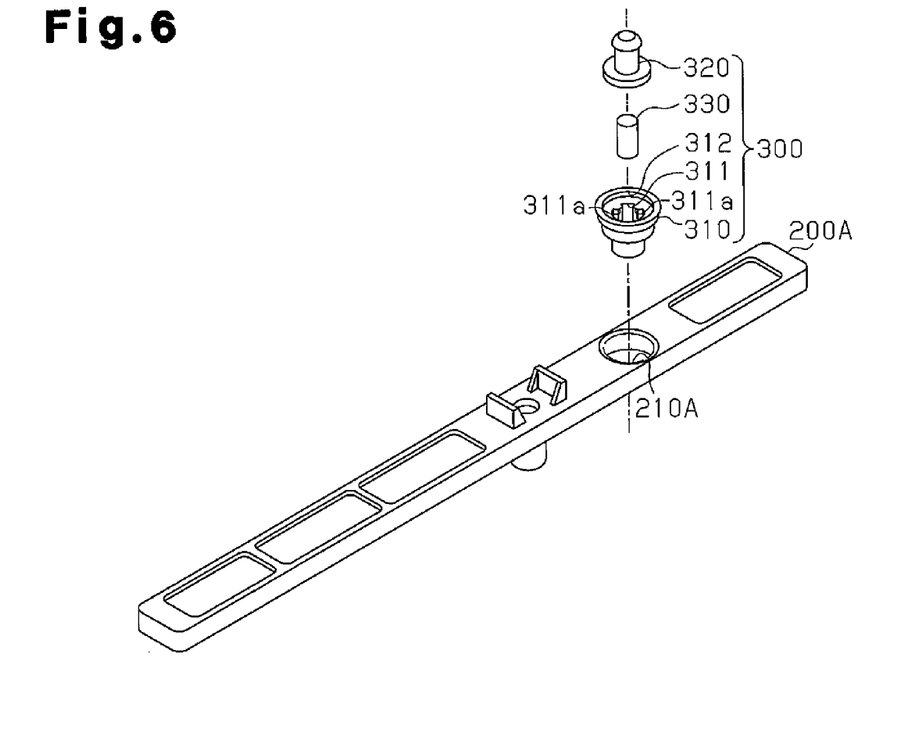
FIG. 6 is a perspective view illustrating a lid body of a battery module related with the structure of a safety valve in a third embodiment.
Figures 7A, 7B, 7C:
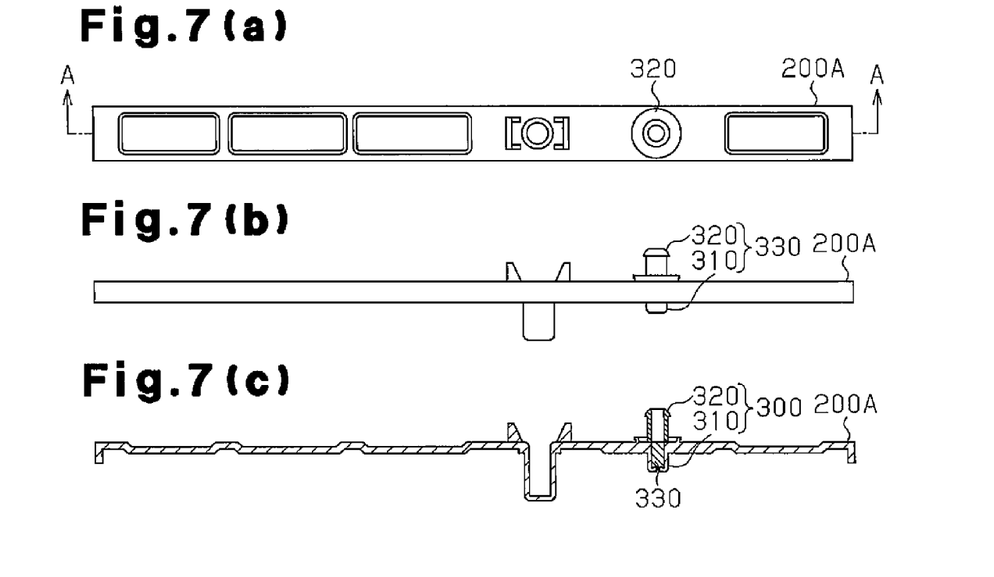
FIG. 7(a) is a plan view illustrating the lid body of FIG. 6.
FIG. 7(b) is a side view illustrating the lid body of FIG. 6.
FIG. 7(c) is a cross-sectional view illustrating a side cross-sectional structure of the lid body of FIG. 6.

FIG. 6 and FIG. 7 are views corresponding to FIG. 2 and FIG. 3, and illustrate an example of the safety valve in the third embodiment. In FIG. 6 and FIG. 7, same reference numerals are given to those components that are the same as the corresponding components of the first embodiment. Such components will not be described again.

As illustrated in FIG. 6, a lid body 200A of the sealed battery of the third embodiment includes a communication port 210A that is in communication with the battery container in the battery module and is coupled to a single safety valve 300.

The safety valve 300 of the third embodiment is configured by a valve case 310 attached to the lid body 200A by engaging the communication port 210A, and a valve cover 320 engaged to the valve case 310. The safety valve 300 of the third embodiment is also formed from, for example, resin.

The valve case 310 includes a tubular valve body accommodation unit 311 for accommodating a valve body 330 configured by a rubber elastic body. A plurality of ribs 311a, which support the valve body 330 from the side, project from the inner side wall of the valve body accommodation unit 311. The valve case 310 includes a circular valve cover accommodation groove 312 for accommodating the valve cover 320 having a circular bottom surface. A valve port (not illustrated) in communication with the battery container is formed at the bottom surface of the valve case 310.

The safety valve 300 configured as above is attached to the communication port 210A of the lid body 200A with the valve body 330 accommodated in the valve body accommodation unit 311 of the valve case 310, as illustrated in the plan view of FIG. 7(a) and the side view of FIG. 7(b) that illustrate the lid body 200A. As illustrated in FIG. 7(c), which is a cross-sectional view taken along line A-A in FIG. 7(a), the valve case 210 is sealed by the valve cover 220 with each valve body 230 accommodated in the valve body accommodation unit 211.

In the third embodiment, a first projection region and a second projection region, in which the area pressure with the valve body 330 satisfy the same conditions as the first embodiment, are formed as projections for supporting the valve body 330 from the bottom surface on the bottom surface of the valve body accommodation unit 311 of the valve case 310 configuring the safety valve 300. In other words, the pressure per unit area with the valve body 330 in the second projection region is set to be higher than the pressure per unit area with the valve body 330 in the first projection region so that the opening function of the safety valve 300 is guaranteed by the second projection region.

In this manner, the third embodiment also improves the sealing function while maintaining the opening function required for the safety valve 300 by the projection including the first projection region and the second projection region arranged on the bottom surface of the valve body accommodation unit 311.

As described above, the sealed battery and the safety valve of the third embodiment have advantages (1) to (5) and (7) described above and also has the following advantage in lieu of advantage (6).

(6A) The battery container is configured by a plurality of communicating battery containers, and a single safety valve 300 is arranged in the lid body 200A including the communication port 210A that is in communication with each battery container. Thus, the sealing function and the opening function of a single safety valve 300 are both suitably satisfied even in a configuration in which the battery containers of the battery module are in communication. This achieves versatility of the safety valve including the projection.

Other Embodiments

Each embodiment described above may be modified to the forms described below.

In the second embodiment, the battery container is configured by a plurality of battery containers 141, which are sealed and partitioned, and the safety valve is arranged in each of the plurality of battery containers 141. Instead, if the battery containers of the sealed battery are in communication in the same manner as the third embodiment, a single safety valve including two projection regions (may be integrated or separate bodies) in the valve seat may be arranged in the lid body of the battery. This also obtains advantages (4A) and (6A).

Furthermore, in each embodiment described above, the safety valve may be arranged in only some of the electric cells of the battery module configured by a plurality of electric cells, which are sealed and partitioned. This increases the degree of freedom in design of the safety valve in the sealed battery.

In each embodiment described above, the projection length H2 of the second projection region R2 in the axial direction of the valve body 230 is longer than the projection length H1 of the first projection region R1 in the axial direction of the valve body 230. Instead, the projection length H2 of the second projection region R2 and the projection length H1 of the first projection region R1 may be equal or the projection length H2 of the second projection region R2 may be shorter than the projection length H1 of the first projection region R1. In this case, for example, the pressure per unit area of the second projection region R2 and the valve body 230 is higher than the pressure per unit area of the first projection region R1 and the valve body 230 by making the contacting area of the second projection region R2 and the valve body 230 smaller than the contacting area of the first projection region R1 and the valve body 230.

Figure 8:
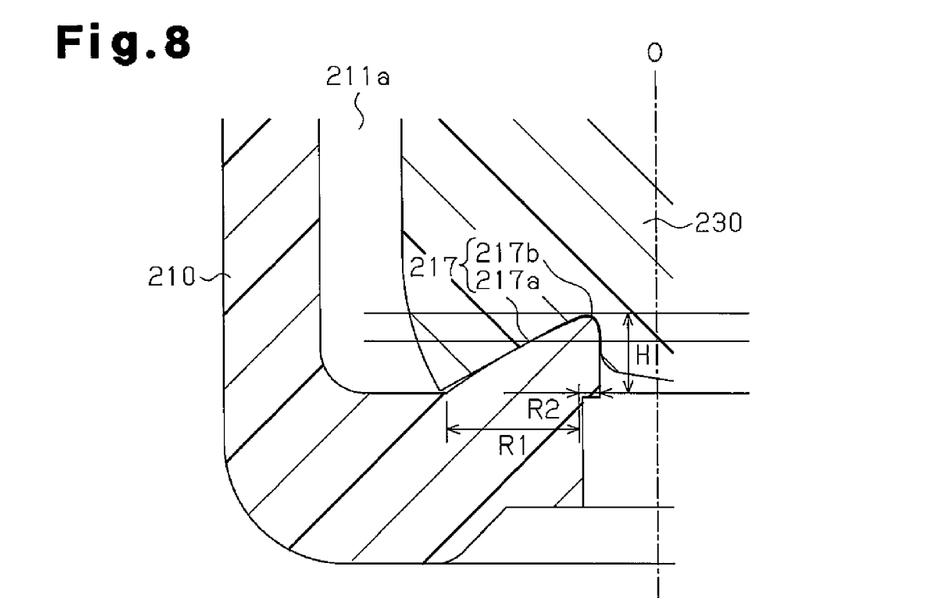
FIG. 8 is a cross-sectional view illustrating a partially enlarged structure of a projection for a safety valve in another embodiment.

In the first and third embodiments, the projection 215 is formed as two composite projections 215, and the cross-section of the projection 215 in the axial direction of the valve body 230 include different curvature radii. Furthermore, in the second embodiment, the first projection region R1 and the second projection region R2 of the projection are configured by two projections 216a, 216b. Instead, the projection may be configured by a projection 217 having a triangular cross-section including a vertex 217b immediately above the inner circumferential edge of the valve port 213, as illustrated in FIG. 8, which corresponds to FIG. 4 and FIG. 5. In this case, an inclined surface 217a, which curvature radius is infinitely large, is formed in the first projection region R1, and the vertex 217b of the projection 217 is formed in the second projection region R2. According to such configuration, the pressure per unit area of the second projection region (vertex 217b) having a steep shape and the valve body 230 becomes higher than the pressure per unit area of the first projection region R1 (inclined surface 217a) having a more gradual shape than the second projection region R2 and the valve body 230. In other words, the opening function of the safety valve is guaranteed by the second projection region R2 (vertex 217b). According to such projection 217, the seal length, which is the contact length of the first projection region R1 (inclined surface 217a) and the valve body 230 becomes considerably larger than the seal length, which is the contact length of the second projection region R2 (vertex 217b) and the valve body 230. In other words, the sealing function of the safety valve is greatly improved by the first projection region R1 (inclined surface 217a) formed at the outer side of the vertex 217b while maintaining the sealed state between the second projection region R2 (vertex 217b), which is provided with the opening function, and the valve body 230.

Figure 9:
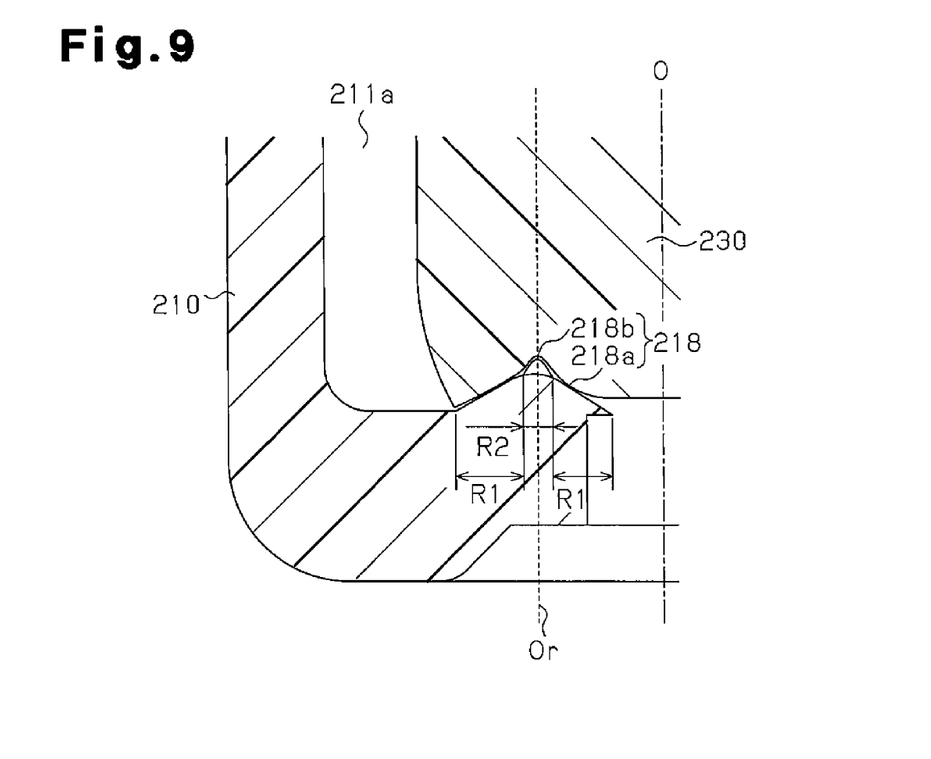
FIG. 9 is a cross-sectional view illustrating a partially enlarged structure of a projection for a safety valve according to another embodiment.

In the same manner, the projection may be configured by a projection 218 including a first projection 218a, which is formed over the entire surface of the formation region of the projection with a predetermined curvature radius, and a second projection 218b, which is formed to be smaller than the first projection 218a at the vertex of the first projection 218a, at the cross-section of the projection in the axial direction of the valve body 230, as illustrated in FIG. 9, for example, which corresponds to FIG. 4 and FIG. 5. According to the projection 218, when using a non-formation region of the second projection 218b in the surface of the first projection 218a as the first projection region R1, and a region including the second projection 218b as the second projection region R2, the contact area of the second projection region R2 (second projection 218b) and the valve body 230 becomes smaller than the contact area of the first projection region R1 and the valve body 230. Furthermore, the pressure per unit area of the second projection region R2 and the valve body 230 becomes higher than the pressure per unit area of the first projection region R1 and the valve body 230 since the vertex of the second projection 218b is higher than the vertex of the first projection 218a. In such a case, the sealing function of the safety valve is considerably improved by the closely-attached state of the first projection region R1 and the valve body 230 while maintaining the opening function of the safety valve by the second projection region R2 since the first projection region R1 at the outer side of the second projection region R2 contacts the valve body 230 at the cross-section in the axial direction of the valve body 230. In addition, the projection merely needs to include two regions, the first projection region and the second projection region that are parallel in the circumferential direction of the valve port 213, and the pressure per unit area of each region and the valve body is set differently.

The projection is ring-shaped as viewed from the upper surface of the valve port 213. Instead, the projection may have a polygonal shape, for example, when the valve port 213 is viewed from the upper surface. In addition, the projection merely needs to be formed to have an annular shape around the valve port 213, and may have any shape as long as the sealing function and the opening function are both satisfied.

In each embodiment described above, the battery module is made of resin, that is, the integrated battery container 100 and the lid body 200 are made of resin. Instead, the integrated battery container and the lid body may be made from a material other than resin such as metal and the like. This increases the variety of the type of battery modules including the safety valve that can be used. In the third embodiment, the single safety valve 300 is made of resin. Instead, the safety valve 300 may be made from a material other than resin such as metal and the like.

In each embodiment described above, the material of the safety valve and the material of the lid body 200 are the same. Instead, the material of the safety valve and the material of the lid body may be different. In this case, different materials may be integrally formed, and the safety valve may be attached to the lid body. This improves the degree of freedom in design of the safety valve.

In each embodiment described above, the battery module configured by electrically connecting six electric cells 140 in series has been illustrated. Instead, the number of electric cells configuring the battery module may be less than six or more than six. Thus, the type and the like of the battery module, to which the safety valve is adopted, may be increased in variety.

In each embodiment described above, the safety valve is arranged in the battery module in which a plurality of electric cells is coupled. Instead, the safety valve may be arranged in a battery module including only one electric cell, a battery container of the electric cell other than the battery module and the like. Thus, the type of battery to which the safety valve is applied may be increased in variety.

In each embodiment described above, the battery module includes the nickel-hydrogen battery. Instead, the battery of the battery module and the like may be a rechargeable battery (rechargeable battery) such as nickel cadmium battery, lithium ion battery, and the like. This increases the range of application of the battery terminal and the battery using the battery terminal.

In each embodiment described above, the battery is a rechargeable battery. Instead, the battery may be a primary battery.

In each embodiment described above, the safety valve is used in the sealed battery. The safety valve may be used for a sealed container in which the internal pressure abnormally rises like the sealed battery. This increases the applications in which the safety valve may be employed.

The invention claimed is:

1. A sealed battery comprising:
a pole plate group provided with a positive electrode and a negative electrode;
a battery container accommodating the pole plate group; and
a return type safety valve that includes a valve case, the valve case including an accommodation unit, the accommodation unit having a valve port, which is in communication with the battery container, and a valve seat extending around the valve port;
a valve body accommodated in the accommodation unit; and
a valve lid that seals the valve port by pushing the valve body against the valve seat, wherein:
the valve seat includes an annular projection that projects toward the valve body;
the projection includes a first projection region and a second projection region, which are defined by a shape of a tip of the projection and arranged in parallel in a circumferential direction of the valve port, wherein each of the first projection region and the second projection region projects toward the valve body such that the valve body is in contact with each of the first second projection region and the second projection region, and wherein the first projection region and the second projection region have different curvature radii in a cross-section of the projection taken along an axial direction of the valve body; and
at least a portion of the first projection region is arranged at an outer side of the second projection region, and the pressure per unit area applied to the second projection region by the valve body is higher than the pressure per unit area applied to the first projection region by the valve body.

2. The sealed battery according to claim 1, wherein the projection is ring-shaped.

3. The sealed battery according to claim 1 or 2, wherein a curvature radius of the first projection region is greater than a curvature radius of the second projection region in the cross-section of the projection in the axial direction of the valve body.

4. The sealed battery according to claim 3, wherein the curvature radius of the first projection region in the cross-section of the projection in the axial direction of the valve body is set to be greater than "1×R" and less than or equal to "10/3×R", where R is the curvature radius of the second projection region.

5. The sealed battery according to claim 1, wherein the first projection region and the second projection region are formed by two separate projections.

6. The sealed battery according to claim 1, wherein a projection length of the second projection region in the axial direction of the valve body is greater than a projection length of the first projection region in the axial direction of the valve body.

7. The sealed battery according to claim 1, wherein the sealed battery includes a nickel-hydrogen battery.

8. A return type safety valve comprising:
a valve case, the valve case including an accommodation unit, the accommodation unit having a valve port, which is in communication with a battery container accommodating a pole plate group provided with a positive electrode and a negative electrode, and a valve seat extending around the valve port;
a valve body accommodated in the accommodation unit; and
a valve lid that seals the valve port by pushing the valve body against the valve seat, wherein:
the valve seat includes an annular projection that projects toward the valve body;
the projection includes a first projection region and a second projection region, which are defined by a shape of a tip of the projection and arranged in parallel in a circumferential direction of the valve port, wherein each of the first projection region and the second projection region projects toward the valve body such that the valve body is in contact with each of the first second projection region and the second projection region, and wherein the first projection region and the second projection region have different curvature radii in a cross-section of the projection taken along an axial direction of the valve body; and
at least a portion of the first projection region is arranged at an outer side of the second projection region, and the pressure per unit area applied to the second projection region by the valve body is higher than the pressure per unit area applied to the first projection region by the valve body.

* * * * *